United States Patent [19]

Frei et al.

[11] 4,123,228

[45] Oct. 31, 1978

[54] FILTERS FOR LIQUIDS

[75] Inventors: Roland Frei, Widnau; Franz Gutmann, Rebstein; Peter Sieber; Peter Koeppel, both of Widnau, all of Switzerland

[73] Assignee: Plaston AG, Kunststoffwerke Hans Frei & Sohne, Widnau, Switzerland

[21] Appl. No.: 824,694

[22] Filed: Aug. 15, 1977

[30] Foreign Application Priority Data

Mar. 21, 1977 [CH] Switzerland ............... 3537/77

[51] Int. Cl.² .......................................... B01D 59/22
[52] U.S. Cl. .................................... 422/274; 99/312; 99/314; 99/315; 210/409; 210/456; 210/477; 210/481; 210/482; 422/261; 422/266
[58] Field of Search ............... 210/305, 306, 407, 409, 210/417, 456, 473–482; 99/300, 304, 312, 314, 315; 23/272 R, 272.6 R, 272.6 S, 271 R

[56] References Cited

U.S. PATENT DOCUMENTS

| 57,218 | 8/1866 | Thomas | 23/272 |
| 960,419 | 6/1910 | Selg | 210/482 |

FOREIGN PATENT DOCUMENTS 548,225  6/1956  Belgium ...................... 210/474

Primary Examiner—Frank Sever
Attorney, Agent, or Firm—Larson, Taylor and Hinds

[57] ABSTRACT

A filter for liquids and particularly coffee comprises a container having a planar horizontal base formed with at least one filtrate drainage opening, and on its inner face formed with a plurality of radial ribs and a central support member which together support a generally planar filter element of thin sheet material in spaced parallel relationship to the base. In use the arrangement produces a toroidal circulation of liquid which prevents compaction of the filter cake and reduces clogging of the filter element.

7 Claims, 2 Drawing Figures

FILTERS FOR LIQUIDS

BACKGROUND OF THE INVENTION

This invention relates to an apparatus for filtration of liquids which is particularly, but not exclusively, applicable to the preparation of beverages such as coffee.

Many designs of filtration apparatus having re-usable filter elements are shown and commonly employed materials for such filter elements have included fabrics made from metals or synthetic plastics materials. One device of this kind comprises a one piece container of synthetic plastics material having a base in which is formed a central opening through which filtrate may drain, a fine mesh filter element being supported at a small distance above the base. It has also been proposed to form ribs or baffles on the inner face of the base projecting into the space between the base and the filter element. The baffles can be used to support the filter element and also divert the downward flow of liquid passing through the filter element through a right angle when it reaches the filtrate space and cause the liquid to flow radially towards the central opening. However, this device suffers from the disadvantage that when it is used to prepare coffee by infusion, and particularly when it is used to prepare small quantities of coffee, part of the hot water introduced into the container flows straight out through the central opening so that the coffee filtrate obtained is relatively dilute. Furthermore, the cake of moist coffee grounds becomes compacted on the surface of the filter element and impedes the flow of liquid therethrough.

SUMMARY OF THE INVENTION

It is an object of this invention to provide filtration apparatus for liquids and particularly, but not exclusively, for coffee having a re-usable filter element and in which the volume of liquid flowing directly through the filter without undergoing infusion with the ground coffee is reduced.

It is another object of this invention to provide filtration apparatus for liquids having a re-usable filter element, in which apparatus suspended particulate material is maintained in suspension in the liquid during filtration thereof by means of a toroidal circulation induced in said liquid because of the pattern of flow of said liquid through the filter.

These and other objects are attained using an apparatus for filtration of liquids comprising:
- a container for liquids;
- a base constituting part of said container and having a horizontal generally planar inner face;
- a plurality of radial ribs on said inner face extending axially into said container and having upper surfaces lying in a plane parallel to and closely spaced from the plane of said inner face, adjacent pairs of ribs defining passageways for radial flow of liquid;
- a support member positioned centrally on said inner face and extending axially into said container and having a flat upper surface lying in the plane of said upper surfaces of said ribs;
- a generally planar filter element of thin sheet material supported within said container on said upper surfaces of said ribs and on said upper surface of said support member in spaced parallel relationship to said base; and
- at least one filtrate drainage opening in said base.

Further objects and advantages of the invention will be apparent from the following description:

DESCRIPTION OF THE PREFERRED FORMS OF THE INVENTION

The container which forms part of the apparatus described above may be polygonal or circular and the support member is also polygonal or circular in cross-section corresponding to the shape of the container. Where the container is circular, the diameter of the support member is preferably from 0.1 to 0.5 times the diameter of the filter element. In a preferred construction the liquid channels formed by the radial ribs may end in an annular channel enclosing a disc-shaped support member or insert, said channel communicating with filtrate outlet holes formed in the base of the container.

When the apparatus is used to brew coffee by infusion, the current of hot water introduced into the container impinges against the support member and rebounds to give a toroidal circulation which counteracts settling of the coffee grounds and helps to reduce clogging of the surface of the filter element thereby. Furthermore the circulation of the hot water causes immediate contact between the hot water and the powdered coffee to take place and causes even the initial portion of the filtrate to be of relatively high strength.

The apparatus has the further advantages that it is of simple construction, is safe to handle and is easy to clean. It can be used with fine or very fine ground coffee and enables the powdered coffee to be fully utilised. It is applicable to the production of coffee by infusion and it can also be used in a household coffee percolator, and in either case it gives a beverage of satisfactory taste.

An embodiment of the invention will now be described by way of example with reference to the accompanying drawings in which.

Figure 1:
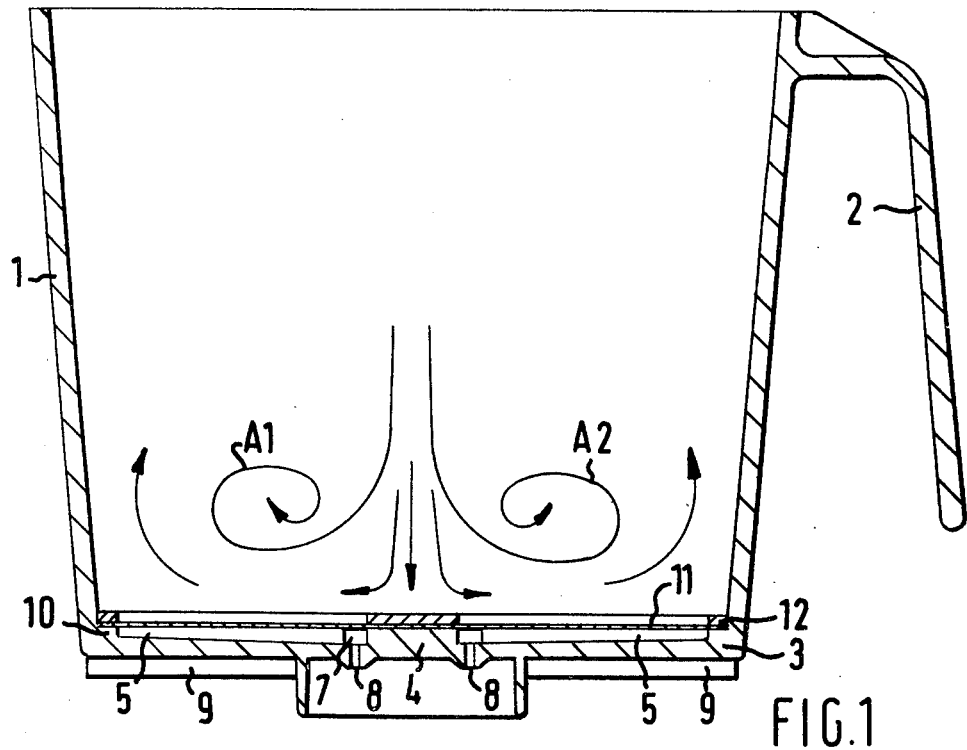
FIG. 1 is a view of a filter in axial cross-section.
Figure 2:
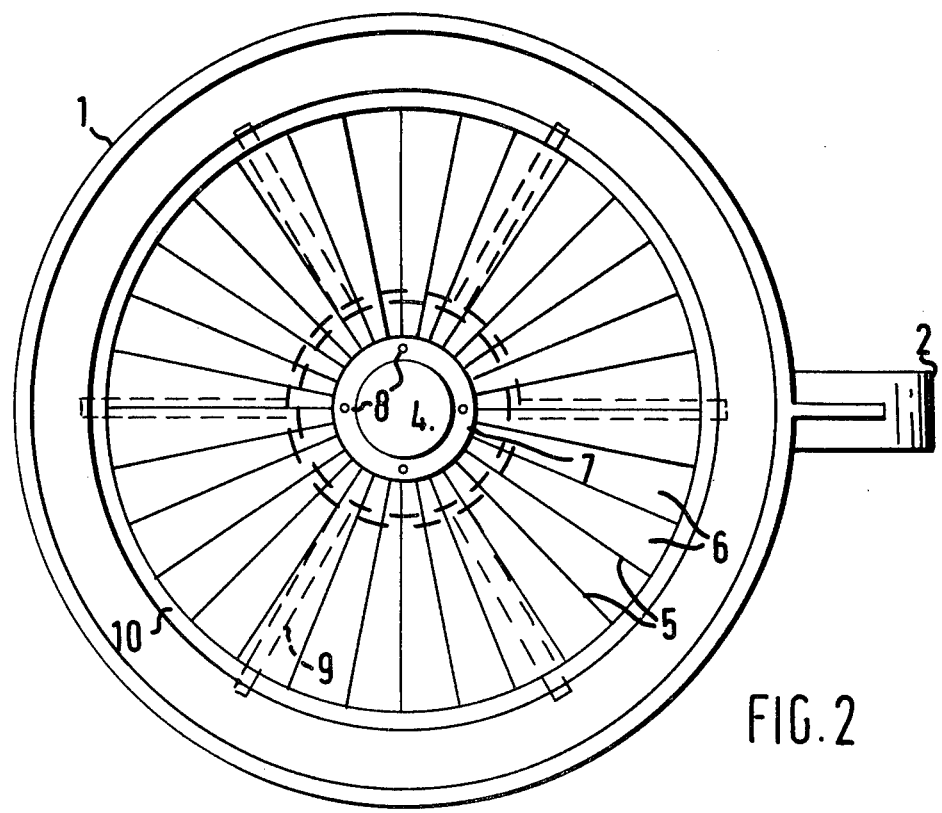
FIG. 2 is an elevation of the filter shown in FIG. 1 with the filter element removed.

In FIG. 1, a one-piece hollow generally cylindrical container 1 of opaque synthetic plastics matrial has a handle 2. The top of the container is open, but the container has a base 3 in which is formed a central upwardly projecting disc-shaped insert 4. The internal face 3' of the base is provided with radially directed ribs 5 between which are defined radial channels 6 for flow of filtrate which radial channels terminate in an annular channel 7 defined between the inner ends of the ribs 5 and the upwardly projecting cylindrical surface of the insert 4. Four symmetrically disposed axial filtrate outlet holes 8 in the base of the container communicate with the annular channel 7. The internal face 3' has a slight downward inclination in the direction of its central region to promote out-flow of liquid from the annular channel 7. An annular shoulder 10 is provided adjacent the periphery of the internal face of the base, the shoulder 10, upper surfaces of the ribs 5 and top end surface of the insert 4 all being at substantially the same axial level so that a disc-shaped filter element 11 which is a rust-resistant steel mesh of mesh width less than 0.05 mm can rest thereon. The periphery of the filter element is secured to the container 1 by means of a welded ring 12 and its central region has on its upper surface a disc of plastics material corresponding to and positioned above the insert 4. The lower face of the base 3 is provided with radial ribs 9 by means of which the filter may be fitted to a filtrate receiving container (not shown) and a downwardly directed circular wall surrounding the lower ends of the outlet holes 8.

When water flows or is poured into the container 1 a large part thereof rebounds from the disc of plastics material above the insert 4 and establishes a generally toroidal circulation of liquid as indicated by arrows A1 and A2 which prevents the filter cake of coffee grounds or other powdered material from compacting. Simultaneously a current of water is produced in the direction of the welded ring 12 which accelerates formation of the filter cake.

The construction described above has the advantage that deformation or displacement of the filter element 11 is prevented and it is retained in a planar configuration by the welded ring 12 and shoulder 10, by the rib 5 and by the insert 4.

While the embodiment of the invention, as herein disclosed, constitutes a preferred form thereof, it is to be understood that other forms might be adopted.

1. Apparatus for leaching soluble components from particulate solids by means of a liquid, said apparatus comprising:
    a container for said solids;
    a base constituting part of said container and having a generally horizontal generally planar inner face;
    a plurality of radial ribs on said inner face extending axially into said container and having upper surfaces lying in a plane approximately parallel to and closely spaced from the plane of said inner face, adjacent pairs of ribs defining passageways for radial flow of liquid;
    a support member positioned centrally on said inner face and extending axially into said container and having a flat upper surface lying in the plane of said upper surfaces of said ribs;
    a generally planar filter element of thin sheet material supported within said container on said upper surfaces of said ribs and on said upper surface of said support member in spaced parallel relationship to said base; means defining an imperforate, flat surface disposed above said support member and said filter element, said support member, ribs, filter element and said imperforate flat surface cooperatively functioning to provide a toroidal circulation sufficient to (a) significantly reduce compacting of said solids (b) promote formation of a filter cake of said solids (c) significantly reduce clogging of said filter element by said solids, and (d) substantially promote recovery of said soluble components from said particulate solids, when said liquid is poured into said container so as to impinge on said imperforate flat surface, and
    at least one filtrate drainage opening in said base.

2. Apparatus according to claim 1, wherein said support member has the shape of a disc of polygonal cross-section.

3. Apparatus according to claim 1, wherein said support member has the shape of a circular disc.

4. Apparatus according to claim 3, wherein said filter element is also disc-shaped and the diameter of said disc-shaped insert is from 0.1 to 0.5 times the diameter of said filter element.

5. Apparatus according to claim 1, wherein said support member has a side surface radially spaced from the inner ends of said radial ribs to define an annular channel, and the or each filtrate drainage opening communicates with said channel.

6. Apparatus according to claim 5, wherein said base is inclined slightly downwardly towards its central portion and the axial height of said ribs increases towards the central portion of said base so that the cross-section of said passageways is constant along their length.

7. Apparatus according to claim 5, wherein four filtrate drainage openings communicate with said annular channel and are disposed symmetrically about said support member.

* * * * *